United States Patent [19]
Arrington-Webb et al.

[11] Patent Number: 5,810,998
[45] Date of Patent: Sep. 22, 1998

[54] PROCESS FOR IMPROVING THE BRIGHTNESS OF FINE-GRAINED KAOLIN CLAYS

[75] Inventors: Lee Ann Arrington-Webb, Sandersville; Chris B. Maxwell, Evans; Prakash B. Malla, Dublin; Amy C. Semratedu, Sandersville, all of Ga.

[73] Assignee: Thiele Kaolin Company, Sandersville, Ga.

[21] Appl. No.: 869,409

[22] Filed: Jun. 5, 1997

[51] Int. Cl.$^6$ .................. B03B 7/00; B03D 1/02; C09C 1/24
[52] U.S. Cl. .................. 209/166; 209/12.1; 209/39; 209/17; 209/10; 501/148; 501/149; 106/486
[58] Field of Search .................. 209/164, 166, 209/12.1, 39, 17, 10; 501/148, 149; 106/486, 487

[56] References Cited

U.S. PATENT DOCUMENTS

| | | |
|---|---|---|
| 3,343,973 | 9/1967 | Billue . |
| 3,450,257 | 6/1969 | Cundy . |
| 3,528,769 | 9/1970 | Lyons . |
| 3,536,264 | 10/1970 | Helton . |
| 3,615,806 | 10/1971 | Torock . |
| 3,635,662 | 1/1972 | Lyons . |
| 3,661,515 | 5/1972 | Iannicelli . |
| 3,701,417 | 10/1972 | Meucode . |
| 3,879,283 | 4/1975 | Mercade . |
| 4,014,709 | 3/1977 | Dykstra . |
| 4,227,920 | 10/1980 | Chapman . |
| 4,492,628 | 1/1985 | Young et al. ............... 209/5 |
| 4,629,556 | 12/1986 | Yoon et al. ............... 209/166 |
| 4,871,466 | 10/1989 | Wang et al. ............... 252/61 |
| 4,929,343 | 5/1990 | Wang et al. ............... 209/166 |
| 5,137,574 | 8/1992 | Suitch . |
| 5,154,767 | 10/1992 | Kunkle . |
| 5,168,083 | 12/1992 | Mattews . |
| 5,190,615 | 3/1993 | Kunkle . |
| 5,385,239 | 1/1995 | Kunkle . |
| 5,393,340 | 2/1995 | Slepetys . |
| 5,522,986 | 6/1996 | Shi . |

*Primary Examiner*—Thomas M. Lithgow
*Attorney, Agent, or Firm*—Jones & Askew, LLP

[57] ABSTRACT

Fine-grained kaolin clays having improved brightness can be produced by (a) using centrifugation to fractionate the clay starting material into finer and coarser fractions, (b) subjecting the coarser fraction to flotation to remove discoloring impurities and (c) combining the finer and floated coarser fractions to produce fine-grained kaolin clays having improved brightness.

19 Claims, No Drawings

5,810,998

1

PROCESS FOR IMPROVING THE BRIGHTNESS OF FINE-GRAINED KAOLIN CLAYS

TECHNICAL FIELD

This invention relates to a process for improving the brightness of fine-grained kaolin clays. In a more specific aspect, this invention relates to improving the brightness of fine-grained kaolin clays by a process which employs fractionation and flotation. This invention also relates to the fine-grained kaolin clays which are produced by the process of this invention and which have improved brightness.

BACKGROUND OF THE INVENTION

Kaolin is a naturally occurring, relatively fine, white clay which may be generally described as a hydrated aluminum silicate. After purification and beneficiation, kaolin clay is widely used as a filler and pigment in various materials, such as rubber and resins, and in various coatings, such as paints and coatings for paper.

Use of kaolin as a coating pigment improves various properties, such as brightness, color, gloss, smoothness, opacity, uniformity of appearance and printability of a paper. As a filler, kaolin is used to extend fiber, reduce cost and improve opacity, brightness and other desirable characteristics of a paper.

As mined, crude kaolin clay contains various forms of discoloring impurities, two major impurities being anatase ($TiO_2$) and iron oxides. To make the clay more acceptable for use in coatings for the paper industry, these impurities must be substantially removed by appropriate techniques.

There are two conventional methods for removal of the discoloring impurities: (1) a physical method, which may involve high gradient magnetic separation, froth flotation and/or selective flocculation and (2) a chemical method, which may involve removal of iron oxides by leaching, usually with sodium hydrosulfite. Although a combination of magnetic separation and chemical leaching may improve the brightness of a crude kaolin clay, the brightness value achieved by these methods is not acceptable for many paper coating applications.

Froth flotation is regarded in the industry as an effective process to remove discoloring impurities from kaolin clay. Typically, a clay to be beneficiated by froth flotation is first formed into an aqueous slurry in the presence of a dispersant, the pH of the slurry is raised to an alkaline value and an "activator" and "collector" are added. Typically, $Ca^{2+}$ ions (CaO, $CaCl_2$) are used as activators, and the fatty acids or tall oil type reagents are used as collectors.

The job of the collector is to selectively absorb to the discoloring impurities (mainly titania particles) and render these impurities hydrophobic. This part of the process is referred to as conditioning. The $Ca^{2+}$ ions are believed to simultaneously interact with the surface hydroxyl groups of titania particles and with the polar portions (hydrophilic) of the collector. The non-polar (hydrophobic) portions of the collector extend away from the titania particles to the aqueous phase, making the overall surface of the titania particles hydrophobic.

The kaolin slurry with the optimum amounts of chemicals is then conditioned by agitation for a set period of time. A frothing agent is added, and a stream of air bubbles is passed through the slurry in a froth flotation cell or column. The hydrophobic surface is more compatible with the air bubbles and, therefore, the titania particles attach to and rise with the bubbles, and are eventually removed from the kaolin slurry. Details of the flotation process to remove titania impurities from kaolin can be found in Cundy U.S. Pat. No. 3,450,257 and Young et al. U.S. Pat. No. 4,492,628.

U.S. Pat. No. 4,629,556 to Yoon et al. uses hydroxamate collectors to float the titania impurities at a pH as low as 6. This process is found to use a much lower dosage of reagents compared to the tall oil collector system. The hydroxamate system may also obviate the need for using a frothing agent, since the hydroxamate possesses frothing properties.

The flotation systems, whether using tall oil, fatty acid or hydroxymate as a collector, are highly effective in removing titania impurities from the coarse-grained Middle Georgia type crude kaolins. However, these flotation systems give a low clay recovery when used with East Georgia fine-grained kaolins. The low recovery is believed due to the preponderance of high surface area fine particles in the East Georgia crude kaolin clays. These high surface area fine particles prevent the kaolin slurry from achieving optimum conditioning which leads to entrainment of the kaolin particles in the froth.

Also, the reserves for Middle Georgia coarse-grained kaolin are near depletion, which will increase dependence on East Georgia fine-grained kaolin to produce a high brightness product to satisfy the demand of paper industries in future years.

In the kaolin industry, crude kaolins are commonly classified to a desired particle size distribution to produce different grades of kaolin. Normally, the coarser particles (>2 $\mu$m) are removed, and the finer particles are used as the product. However, in some special cases, most of the finer fraction (<0.2 $\mu$m) may also be removed. For example, Mathews et al. U.S. Pat. No. 5,168,083 describes the preparation of a paper coating kaolin pigment from coarse-grained Middle Georgia crude kaolin by scrub grinding followed by a controlled centrifugation to remove the colloidal particles (<0.2 $\mu$m). The pigment thus produced is claimed to have improved opacity, gloss and printing properties. Although the Mathews et al. patent involves modifying the particle size distribution by controlled centrifugation to produce a high opacity pigment, this is not related to improving the brightness of a fine-grained East Georgia crude kaolin clay in conjunction with a flotation process.

Based upon the foregoing discussion, there is a need in the industry for a process to improve the brightness of fine-grained kaolin clay with an increased clay recovery. Further, there is a need in the industry for a process which will produce a high brightness kaolin pigment suitable for paper coating and filling applications.

SUMMARY OF THE INVENTION

Briefly described, the present invention provides a process for improving the brightness of fine-grained kaolin clay. More specifically, this invention provides a process for such improvement in which a fine-grained crude kaolin clay starting material is separated by centrifugation into coarser and finer fractions. The coarser fraction is subjected to froth flotation, and then the two fractions are combined to form a kaolin clay having a brightness higher than that of the fine-grained crude kaolin clay starting material.

The present invention provides a process by which fine-grained crude kaolin clay can be floated to produce a high brightness pigment with an increased clay recovery.

In the course of our work, we have found that most of the discoloring impurities in fine-grained kaolin are concentrated in the coarser fraction. Consequently, the coarser fraction is lower in brightness compared to the finer fraction. The kaolin industry is aware that the fine-grained kaolins do not respond as well to a flotation process as do the coarse-grained kaolins. This is due to the abundance of high surface area fine particles in the crude clay which interfere with the conditioning process and lead to the entrainment of the kaolin particles in the froth, and hence a low clay recovery.

Our invention involves separating the finer fraction to achieve a more efficient flotation of the coarser fraction to obtain a high brightness product. The high brightness floated coarser fraction is then combined with the previously separated finer fraction to provide a clay recovery of at least about 85%. The combined product may then be classified, magnetically treated and/or leached to give a final product having a brightness which is improved over that of the starting material.

In another embodiment of this invention, each fraction (i.e., the previously separated finer fraction and the high brightness floated coarser fraction) can be classified, magnetically treated and/or leached to increase the brightness of that fraction, and the fractions can then be combined.

Accordingly, an object of this invention is to provide a process to improve the brightness of fine-grained kaolin clay.

Another object of this invention is to provide a process to increase the clay recovery when fine-grained kaolin clay is subjected to a flotation process.

Another object of this invention is to provide a process by which the subsequent removal of discoloring impurities from fine-grained kaolin clays is more efficient.

Still another object of this invention is to provide a fine-grained kaolin clay which has improved color as compared to the fine-grained crude kaolin clay starting material.

These and other objects, features, and advantages of this invention will become apparent from the following detailed description.

DETAILED DESCRIPTION OF THE INVENTION

In accordance with the present invention, the brightness of fine-grained kaolin clays is improved (i.e., increased) by a process which comprises the sequential steps of:

Preparing an optimally dispersed aqueous slurry of a fine-grained crude kaolin clay starting material; fractionating the slurry by centrifugation into two fractions—a first finer fraction predominantly containing particles of less than 0.2 microns and a second coarser fraction predominantly containing particles of at least 0.2 microns; mixing the second fraction with a collector to condition the impurities; subjecting the conditioned second fraction to a froth flotation process to remove impurities; and combining the first and second fractions to produce a kaolin clay having a brightness which is higher than the brightness of the fine-grained crude kaolin clay starting material.

The pH of the starting material slurry is preferably from about 6.0 to about 9.0, and most preferably from about 6.5 to about 7.5.

The froth flotation process can be conducted in conventional flotation equipment, such as a column cell or mechanical cell.

In this invention, the collector may be a tall oil compound or a mixture of such compounds; a fatty acid compound or a mixture of such compounds; a hydroxamate compound or a mixture of such compounds; or a mixture of tall oil, fatty acid and/or hydroxamate compounds.

The fatty acid compound has the general formula:

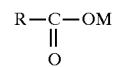

in which R is an alkyl, aryl or alkylaryl group having 1–26 carbon atoms, and M is hydrogen, an alkali metal or an alkaline earth metal.

Examples of suitable R groups include methyl, ethyl, butyl, octyl, lauryl, 2-ethylhexyl, oleyl, eicosyl, phenyl, naphthyl and hexylphenyl.

Examples of suitable alkali metals are lithium, sodium and potassium.

Examples of suitable alkaline earth metals are magnesium, calcium and barium.

These fatty acid compounds are commercially available, such as from Westvaco Corporation, Chemical Division, Charleston Heights, S.C.

An especially preferred fatty acid compound is commercially available from Westvaco Corporation under the trademark WESTVACO L-5. This compound is a tall oil, which is a mixture of fatty acid compounds.

The hydroxamate compound has the general formula:

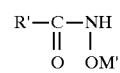

in which R' is an alkyl, aryl or alkylaryl group having 4–28 carbon atoms, and M' is hydrogen, an alkali metal or an alkaline earth metal.

Examples of suitable R' groups include butyl, hexyl, octyl, dodecyl, lauryl, 2-ethylhexyl, oleyl, eicosyl, phenyl, tolyl, naphthyl and hexylphenyl.

Examples of suitable alkali metals are lithium, sodium and potassium.

Examples of suitable alkaline earth metals are magnesium, calcium and barium.

These hydroxamate compounds are available commercially, such as from Cytec Industries, Inc., Paterson, N.J.

An especially preferred hydroxamate compound is commercially available from Cytec Industries, Inc. under the trademark S-6493 MINING REAGENT. This compound is a mixture of alkyl hydroxamic acids.

The hydroxamate collectors can be prepared by conventional methods, such as shown in Yoon & Hilderbrand U.S. Pat. No. 4,629,556; Wang & Nagaraj U.S. Pat. No. 4,871,466; and Wang & Nagaraj U.S. Pat. No. 4,929,343.

Examples of hydroxamates which are useful in the process of the invention include potassium butyl hydroxamate, potassium octyl hydroxamate, potassium lauryl hydroxamate, potassium 2-ethylhexyl hydroxamate, potassium oleyl hydroxamate, potassium eicosyl hydroxamate, potassium phenyl hydroxamate, potassium naphthyl hydroxamate, potassium hexylphenyl hydroxamate, and the corresponding salts of sodium and other alkali or alkaline earth metals. The salts can be converted to the corresponding acids by conventional methods known to those skilled in the art.

The time required for conditioning the impurities prior to flotation will vary depending upon the kaolin clay being processed. In general, however, conditioning will require at least about 5 minutes.

As noted above, after fractionation, the finer fraction can be classified, magnetically treated and/or leached in conventional methods to increase (i.e., improve) the brightness of that fraction. Similarly, the high brightness floated coarser fraction can be classified, magnetically treated and/or leached in conventional methods to increase (i.e., improve) the brightness of that fraction. After such optional processing, the fractions can then be combined.

As a result of impurities being removed during the froth flotation process, the floated coarser fraction has a higher brightness than that of the coarser fraction prior to froth flotation. In this invention, the high brightness floated coarser fraction is then combined with the finer fraction to produce a kaolin clay having a brightness which is higher than the brightness of the starting material.

In still another embodiment of this invention, the combined finer and floated coarser fractions can be further processed to increase (i.e., improve) the brightness of the kaolin clay product. Such treatments include classification, magnetic treatment and/or leaching.

The present invention is further illustrated by the following examples which are illustrative of certain embodiments designed to teach those of ordinary skill in the art how to practice this invention and to represent the best mode contemplated for practicing this invention.

EXAMPLE I

A control sample is prepared from a fine-grained East Georgia crude kaolin clay (Crude A) by a conventional flotation process without fractionation. The crude contains 40% <0.2 $\mu$m fraction. 2000 g crude is dispersed at 60 wt. % solids with 3 lb/ton soda ash and 4 lb/ton sodium polyacrylate and blunged using a Cowles dissolver with an 8" baffled container and 4" blade at 5000 RPM for 30 minutes, then screened through a 270 mesh screen. The sample is prepared for flotation by raising the pH of the slurry to 10.0 with ammonium hydroxide, followed by conditioning with 1.5 lb/ton calcium chloride and 8 lb/ton tall oil at 60 wt. % solids in the Cowles dissolver. The suspension is diluted to 20 wt. % solids and floated in a Denver cell at 1500 RPM mixing speed for 75 minutes. The suspension is then ozonated for 30 minutes. The recovery through the flotation process is 49%. The ozonated product is settled (classified) for 10 minutes/inch, magnetically treated, leached with 8 lb/ton sodium hydrosulfite and single filtered. The brightness, color and recovery data are given in Table 1.

EXAMPLE II

Three 4000 g batches of the fine-grained Crude A used in Example I are dispersed at 60 wt. % solids with 3 lb/ton soda ash and 4 lb/ton sodium polyacrylate and blunged using a Cowles dissolver with an 8" baffled container and 4" blade at 5000 RPM for 30 minutes. The products are homogenized, screened through a 270 mesh screen and diluted to 20 wt. % solids.

The slurry is centrifuged to separate most of the colloidal particles <0.2 $\mu$m. Recovery from the centrifuge is 52% fine and 48% coarse. The coarser fraction contains 14% <0.2 $\mu$m. The finer fraction contains 58% <0.2 $\mu$m and is decanted and retained.

The coarser fraction is diluted to 60 wt. % solids and prepared for flotation by raising the pH to 10.0 with ammonium hydroxide, then conditioned with 1.5 lb/ton calcium chloride and 8 lb/ton tall oil and diluted to 20 wt. % solids and floated in a Denver flotation cell at 1500 RPM mixing speed until frothing ceases (about 75 minutes). The suspension is ozonated for 30 minutes. The recovery through the flotation step is 73%.

The floated and ozonated coarse fraction is then combined with the previously separated finer fraction. Since the recovery through the flotation step is 73%, the new blend ratio of coarse: fine fraction is 40:60. This makes the total recovery after flotation and combination 87% (35% coarse +52% fine). The blended product is then settled for 10 minutes/inch, magnetically treated, leached with 8 lb/ton sodium hydrosulfite and single filtered.

The brightness, color and recovery data are given in Table 1. Although the brightness and color data of the product floated by the process of the present invention (Example II) and the conventional process (Example I) are equivalent for all practical purposes, the product recovery is much higher in Example II. As can be seen from Table I, the recovery is 87% with the present invention, but only 49% when conventional processing is used.

TABLE 1

|  | GE Brightness | Hunter L | a | b | Recovery (%) |
|---|---|---|---|---|---|
| Crude A | 82.3 | 94.8 | −1.14 | 6.09 | N/A |
| Example I (conventional processing) | 89.4 | 96.3 | 0.28 | 2.66 | 49 |
| Example II (process of this invention) | 89.6 | 96.3 | 0.26 | 2.54 | 87 |

EXAMPLE III

This example describes the preparation of a control sample by a conventional flotation process using a fine-grained East Georgia crude kaolin clay (Crude B) which is different in brightness, color and other characteristics from the Crude A used in Example I. The Crude B contains 44% <0.2 $\mu$m fraction.

2000 g of the Crude B is blunged at 60 wt. % solids with 3 lb/ton soda ash and 3.5 lb/ton sodium polyacrylate using a Cowles dissolver with an 8" baffled container and 4" blade at 5000 RPM and passed through a 325 mesh screen. 2667 g of the screened slurry (1600 g dry clay) is poured in the Cowles dissolver, and ammonium hydroxide is added to raise the pH to 10.0. 0.75 lb/ton calcium chloride and 7 lb/ton tall oil are added, and the batch is blunged in the Cowles dissolver at 5600 RPM. The suspension is diluted to 20 wt. % solids in a Denver flotation cell and floated at 1500 RPM mixing speed until frothing ceases. The recovery through the flotation step is 69%. The suspension is ozonated for 30 minutes.

The kaolin is settled at 10 minutes/inch, magnetically treated, leached with 6 lb/ton leach and 2 lb/ton alum at pH=3.0 and single filtered. The leached cake is dried, pulverized and tested for brightness and color. The brightness, color and recovery data are given in Table 2.

EXAMPLE IV

The starting crude used in this example is obtained from the same mine location as the Crude B used in Example III, but is collected at a different time. Three batches of 4000 g crude are blunged at 60 wt. % solids with 3 lb/ton soda ash and 3.5 lb/ton sodium polyacrylate using a Cowles dissolver with an 8" baffled container and 4" blade at 5000 RPM for 10 minutes per batch. All the slurried material is combined and passed through 200 and 270 mesh screens, then diluted to 20 wt. % solids.

The dilute suspension is centrifuged once to separate most of the colloidal particles <0.2 μm. The coarser fraction contains 9% <0.2 μm. The finer fraction contains 66% <0.2 μm. After centrifugation, the finer fraction is decanted and saved for future processing. The finer fraction contains 62% of the centrifuged kaolin with 38% of the centrifuged kaolin in the coarser fraction.

Some of the coarser fraction (1600 g dry clay) is diluted to 60 wt. % solids in the Cowles dissolver, the pH is raised to 10.0 with ammonium hydroxide, and 0.75 lb/ton $CaCl_2$ and 7 lb/ton tall oil are added. The batch is blunged at 5600 RPM with a 4" blade. The suspension is diluted to 20 wt. % solids in a Denver flotation cell and floated at 1500 RPM mixing speed until frothing ceases. The suspension is ozonated for 30 minutes and 1120 g dry clay at 20 wt. % solids is retained, yielding a recovery of 70% through flotation.

The coarser fraction is then combined with the finer fraction. Because 70% recovery of the 38% coarser fraction gives 27 and 100% of the finer fraction is retained, the kaolin is blended 27 parts:62 parts (or 30 percent:70 percent) of coarser fraction:finer fraction. This combination shows effectively 89% recovery of the kaolin through the flotation step.

The blended kaolin is settled 10 minutes/inch, magnetically treated, leached with 6 lb/ton sodium hydrosulfite and 2 lb/ton alum at pH=3 and single filtered. The leached and dried cakes are then pulverized and characterized.

The brightness, color and recovery data are shown in Table 2. The data again demonstrate that the recovery (89%) of the product by the process of the present invention is much higher compared to the recovery (69%) by the conventional flotation processing of Example III.

TABLE 2

|  | Brightness | Hunter | | | Recovery (%) |
|---|---|---|---|---|---|
|  |  | L | a | b |  |
| Crude B | 85.3 | 95.6 | 0.15 | 4.9 | N/A |
| Example III (conventional processing) | 90.7 | 96.8 | 0.25 | 2.6 | 69 |
| Crude B | 85.7 | 95.6 | 0.05 | 4.7 | N/A |
| Example IV | 91.2 | 97.0 | 0.03 | 2.5 | 89 |

This invention has been described in detail with particular reference to certain embodiments, but variations and modifications can be made without departing from the spirit and scope of the invention as defined in the following claims.

What is claimed is:

1. A process for improving the brightness of fine-grained kaolin clay, wherein the process comprises the sequential steps of:
   A. preparing an optimally dispersed aqueous slurry of a fine-grained crude kaolin clay starting material;
   B. fractionating the slurry by centrifugation into a finer fraction predominantly containing particles of less than 0.2 microns and a coarser fraction predominantly containing particles of at least 0.2 microns;
   C. mixing the coarser fraction with a collector to condition the impurities;
   D. subjecting the conditioned coarser fraction to a froth flotation process to remove impurities; and
   E. combining the finer and coarser fractions to produce a kaolin clay having a brightness which is higher than the brightness of the fine-grained crude kaolin clay starting material.

2. A process as defined by claim 1 wherein the starting material slurry has a pH of about 6.0 to about 9.0.

3. A process as defined by claim 2 wherein the pH is from 6.5 to 7.5.

4. A process as defined by claim 1 wherein, prior to fractionation, the aqueous slurry is screened to remove large particles.

5. A process as defined by claim 1 wherein the collector is a fatty acid compound.

6. A process as defined by claim 5 wherein the fatty acid compound has the formula:

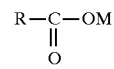

in which R is an alkyl, aryl or alkylaryl group having 1–26 carbon atoms, and M is hydrogen, an alkali metal or an alkaline earth metal.

7. A process as defined by claim 6 wherein R is methyl, ethyl, butyl, octyl, lauryl, 2-ethylhexyl, oleyl, eicosyl, phenyl, naphthyl or hexylphenyl.

8. A process as defined by claim 6 wherein the alkali metal is lithium, sodium or potassium.

9. A process as defined by claim 6 wherein the alkaline earth metal is magnesium, calcium or barium.

10. A process as defined by claim 1 wherein the collector is a tall oil compound.

11. A process as defined by claim 1 wherein the collector is a hydroxamate compound.

12. A process as defined by claim 11 wherein the hydroxamate compound has the formula:

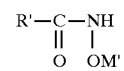

in which R' is an alkyl, aryl or alkylaryl group having 4–28 carbon atoms, and M' is hydrogen, an alkali metal or an alkaline earth metal.

13. A process as defined by claim 12 wherein R' is butyl, hexyl, octyl, dodecyl, lauryl, 2-ethylhexyl, oleyl, eicosyl, phenyl, tolyl, naphthyl or hexylphenyl.

14. A process as defined by claim 12 wherein the alkali metal is lithium, sodium or potassium.

15. A process as defined by claim 12 wherein the alkaline earth metal is magnesium, calcium or barium.

16. A process as defined by claim 1 wherein the finer fraction is classified, magnetically treated or leached prior to being combined in step (E) with the coarser fraction.

17. A process as defined by claim 1 wherein the coarser fraction is classified, magnetically treated or leached prior to being combined in step (E) with the finer fraction.

18. A process as defined by claim 1 wherein the combined finer and coarser fractions are classified, magnetically treated or leached.

19. A process as defined by claim 1 wherein an activator is added with the collector to condition the impurities.

* * * * *